United States Patent [19]
Mizuta et al.

[11] Patent Number: 5,596,253
[45] Date of Patent: Jan. 21, 1997

[54] VEHICLE-MOUNTED MOTOR DRIVE APPARATUS

[75] Inventors: Ken Mizuta, Miyagi-ken; Ken Shibazaki, Furukawa; Yukio Miura, Furukawa; Kazunori Fujioka, Furukawa; Toshimichi Saito, Furukawa; Isao Takagi, Furukawa, all of Japan

[73] Assignee: Alps Electric Co., Ltd., Tokyo, Japan

[21] Appl. No.: 441,907

[22] Filed: May 16, 1995

[30] Foreign Application Priority Data

May 17, 1994 [JP] Japan .................................. 6-102847
Jun. 23, 1994 [JP] Japan .................................. 6-141857

[51] Int. Cl.⁶ ........................................................ H02P 3/08
[52] U.S. Cl. .......................... 318/469; 318/266; 318/455; 49/28
[58] Field of Search ..................... 318/455, 452, 318/469, 447, 266, 283, 466; 49/28–30, 26, 280

[56] References Cited

U.S. PATENT DOCUMENTS 4,220,900  9/1980  Mintz ...................... 318/266
4,709,196  11/1987  Mizuta .
4,746,845  5/1988  Mizuta et al. .
5,069,000  12/1991  Zuckerman .................................. 49/28
5,076,016  12/1991  Adams et al. ............................... 49/30

Primary Examiner—John W. Cabeca
Attorney, Agent, or Firm—Guy W. Shoup; Patrick T. Bever

[57] ABSTRACT

A vehicle-mounted motor drive apparatus which stops the rotation of a motor immediately after an object obstructs a movable part driven by the motor. The drive apparatus includes a motor drive device for selectively driving and stopping a motor, an electric current measuring device for measuring a value of electric current flowing through the motor, a change-in-current-value detecting device for detecting an incremental change in the motor current, and a motor control device for supplying a first control signal or a second control signal to the motor drive device. The motor drive device continuously drives the motor according to the polarity of the detected increment of the current value in response to the first control signal, and immediately stops driving the motor in response to the second control signal.

10 Claims, 7 Drawing Sheets

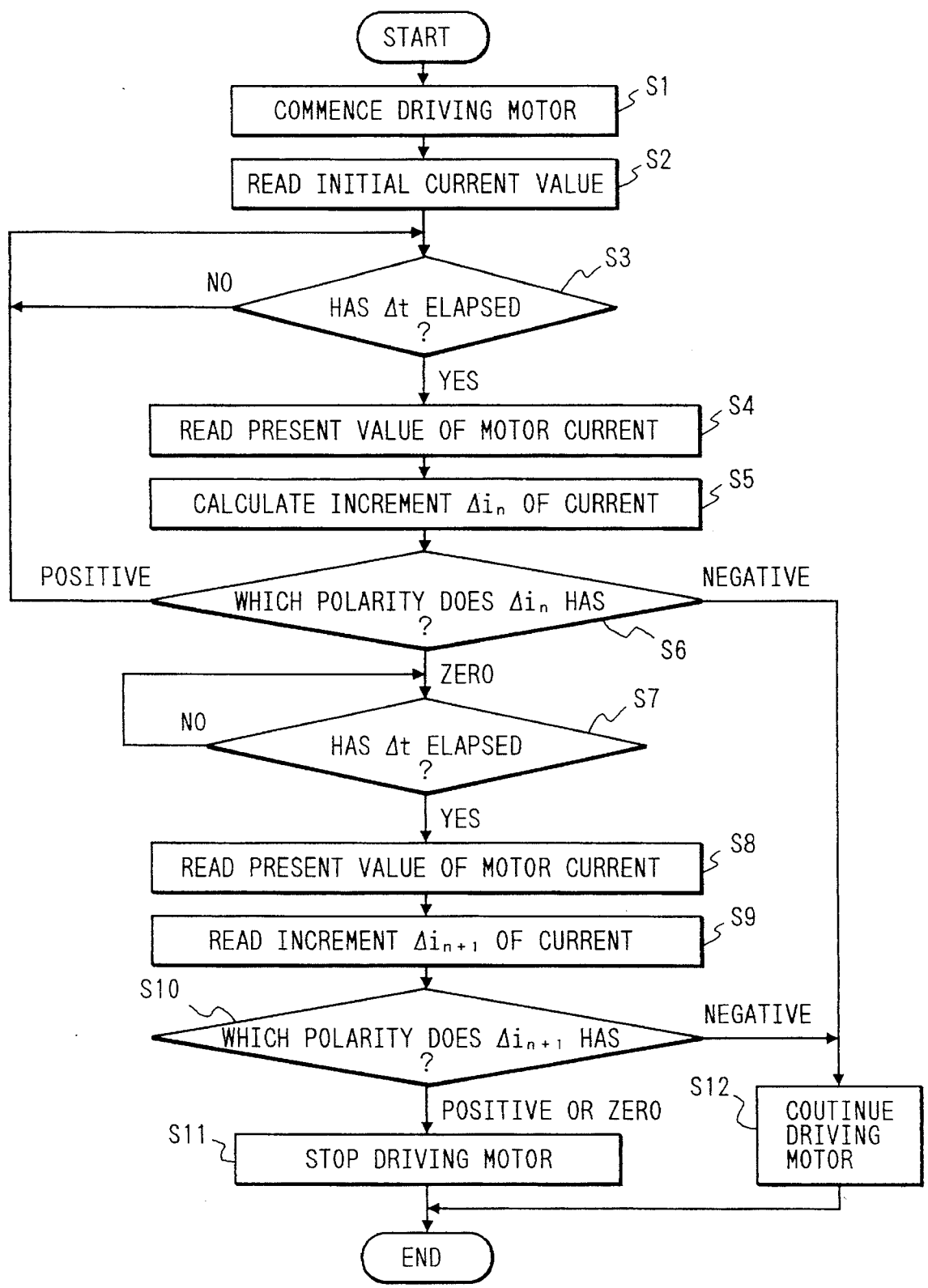

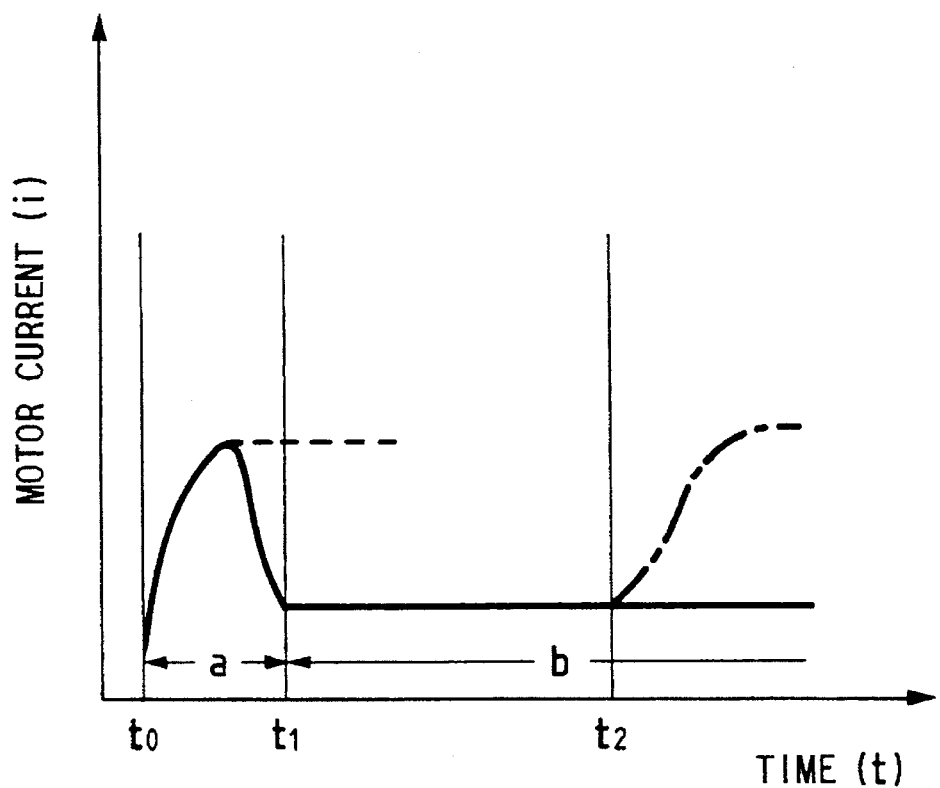

VEHICLE-MOUNTED MOTOR DRIVE APPARATUS

BACKGROUND OF THE INVENTION

1. Field of the Invention

The present invention generally relates to a vehicle-mounted motor drive apparatus.

More particularly, the present invention relates to a safety motor drive apparatus adapted to perform a safety detection even when some object is caught in movable parts such as a power window and a sun roof or the like of a motor vehicle during a starting compensation time of a motor for opening and closing the movable part. Further, the present invention relates to a motor drive apparatus for a power window, which is used to perform and cancel an automatic operation of moving up and down the window of a motor vehicle.

2. Description of the Related Art

Generally, movable parts such as a power window and a sun roof or the like of a motor vehicle are usually opened and closed by driving motors. Further, such opening and closing of the movable parts are performed by operating a manual switch provided in the vehicle. Moreover, safety motor drive apparatuses for opening and shutting such movable parts as a power window and a sun roof or the like by means of motors perform safety operations of stopping or reversing the revolutions of motors immediately when some objects are caught in the movable parts, for the purpose of preventing a passenger or the like from being hurt by getting a part of his body caught in the movable part and also preventing a part of a motor and the like from being heated and damaged by getting a solid object caught in the movable part when opening and closing the movable parts, especially, when shutting the movable parts. In this case, a safety detection is to detect change in electric current (namely, motor current) flowing through a motor and to stop or reverse the revolutions of the motor as the result of the detection of abnormal large change in value of electric current flowing through the motor.

Meanwhile, in the case of a known safety motor drive apparatus, such a safety detection is not performed within a starting compensation time (usually, 100 msec or so) between a moment, at which the motor is started, and another moment at which the revolution of the motor becomes put into a stable condition, until the starting compensation time has elapsed.

Referring now to FIG. 4, there is shown a characteristic diagram for illustrating examples of change in motor current in the cases that the movable parts such as a power window and a sun roof or the like are normally opened and shut by means of motors and that the movable parts are opened and closed when some object is caught in the movable part.

In FIG. 4, the vertical axis and the horizontal axis represent motor current and time, respectively. In this figure, a period of time (namely, a time zone a) between moments $t_0$ and $t_1$ is a starting compensation time of a motor. Further, another period of time (namely, a time zone b) subsequent to the moment $t_1$ is an operation time after the starting compensation time has elapsed, namely, a stable revolution time. Moreover, the solid line designates how the motor current changes in the case where the movable part is normally opened and closed. The dotted line denotes how the motor current changes in the case where an object is caught in the movable part during the starting compensation time (namely, the time zone a). Moreover, the one-dot chain line indicates how the motor current changes in the case where an object is caught in the movable part at the moment $t_2$ in the stable revolution time (namely, the time zone b).

As shown in FIG. 4, in the case where the movable part such as a power window, a sun roof or the like is normally opened and closed, in the starting compensation time (namely, the time zone a), the motor current changes as follows. Namely, the current first starts increasing sharply at the moment $t_0$ and thereafter the current starts decreasing abruptly past the middle thereof. Then, in the stable revolution time (namely, the time zone b) subsequent to the starting compensation time (namely, the time zone a), the motor current becomes kept almost constant. Further, when the movable part such as a power window, a sun roof or the like is opened and closed in the starting compensation time (namely, the time zone a) and the stable rotation time (namely, the time zone b), especially, in the case where some object is caught in the movable part when this movable part is closed in the starting compensation time (namely, the time zone a), the motor current becomes kept at a value close to the maximum current value thereof during the starting compensation time (namely, the time zone a). However, when the movable part is closed in the stable rotation time (namely, the time zone b), the motor current first increases to a specific value close to the maximum value thereof sharply, and thereafter the motor current is kept at such a specific value thereof.

Meanwhile, in recent years, a power window has come to be employed not only in a luxury car but in an ordinary car owing to its operability. Thus the power window has come into widespread use. Such conventionally known power windows are classified into two types according to the kind of a device for performing an automatic operation of moving up the window and canceling this automatic operation. Namely, a mechanically latching type and a relay latching type.

FIGS. 7A and 7B are block diagrams which illustrate the configurations of a device of the mechanically latching type and a device of the relay latching type, respectively and schematically.

As shown in FIGS. 7A and 7B, a power window switch 151 and a motor 152 for moving up and down the window in response to a switching operation, which occurs in this switch 151, are connected to a lock detecting circuit 153 for detecting a locked state of the window. An ignition circuit 154 for supplying driving power to the power window switch 151, the motor 152 and so on is connected to a mechanical latching mechanism 155 for latching the power window switch 151. This mechanical latching mechanism 155 is connected to a solenoid mechanical canceling mechanism 156 for canceling a latching operation of the mechanical latching mechanism 155. The solenoid mechanical canceling mechanism 156 controls the mechanical latching mechanism 155 according to a signal sent from the lock detecting circuit 153. An automatic latching relay 157 is connected to a latching circuit 158 which is operative to drive this relay 157. A canceling circuit 159 is operative to cancel an operation of this latching circuit to drive the automatic latching relay 157.

Further, the mechanical latching type device of FIG. 7A is operative to perform a mechanical latching of a solenoid by means of a mechanism element, to perform an automatic operation of moving up and down the window, to cancel the mechanical latching by means of the mechanism element and to cancel the automatic operation of moving up and down the window.

In contrast, the relay latching type device of FIG. 7B is operative to perform an automatic operation of moving up and down the window by means of an electronic circuit and to cancel the automatic operation by means of the electronic circuit.

As described above, a safety detection is effectively achieved in the safety motor drive apparatus when an object is caught in the movable part during the stable revolution time (namely, the time zone b) subsequent to the starting compensation time (namely, the time zone a) which is a period of time from a moment, at which the motor is started, to another moment at which the revolution of the motor becomes stable. Thus, predetermined safety functions are fulfilled. In contrast, when an object is caught in the movable part during the starting compensation time (namely, the time zone a), no safety detection is achieved. Thus, the predetermined safety functions are not fulfilled.

However, as illustrated in FIG. 4, electric current, the value of which is close to the maximum value thereof, flows through the motor during a period of time in the starting compensation time (namely, the time zone a), though such a period of time is short. Therefore, when some object, especially, a part of a passenger or the like is caught in the movable part such as a power window, a sun roof or the like in this starting compensation time (namely, the time zone a), it is feared that the passenger is sometimes injured seriously.

The present invention is accomplished to resolve such a problem.

Accordingly, a first object of the present invention is to provide a vehicle-mounted motor drive apparatus which is adapted to immediately stop the rotation of a motor if an object or the like is caught in a movable part during the revolution of the motor, thereby fulfilling safety functions.

Further, in the known mechanical latching type device for use in a power window apparatus, the solenoid should have a large canceling load so as to oppose the latch holding power of the mechanical latching mechanism 155. Moreover, the solenoid should inevitably have a large size so as to fully achieve an operation thereof against variation in supply voltage (ignition voltage) directly supplied from a car battery and in ambient temperature. Consequently, the known mechanical latching type device has encountered a problem that the size of a power window unit becomes large.

In contrast, the known relay latching type device can have a small-sized power window unit. However, in the case of the known relay latching type device, the automatic operation of moving up and down the window, as well as the canceling of such an automatic operation, is performed by using an electronic circuit. Thus, the electronic circuit picks up various kinds of noises generated in the interior of a motor vehicle. Consequently, the known relay latching type device has a problem that a malfunction occurs in the electronic circuit and therefore, the reliability of the power window is deteriorated.

The present invention is created to further eliminate this problem.

Therefore, a second object of the present invention is to provide a vehicle-mounted motor drive apparatus which is small in size and weight and has a small number of components and is insusceptible to variation in supply power and ambient temperature and to the influence of various kinds of noises.

Moreover, a third object of the present invention is to provide a vehicle-mounted motor drive apparatus which can quickly change a direction, in which a movable part such as a window is moved, to another direction when a selector switch for switching the direction is immediately operated at the time of commencing the movement of the movable part in a direction.

SUMMARY OF THE INVENTION

To attain the first object, in accordance with an aspect of the present invention, there is provided a vehicle-mounted motor drive apparatus which comprises a motor for opening and closing a movable part which is openable and closable, a motor drive means for selectively driving and stopping the motor, an electric current measuring means for measuring the value of electric current flowing through the motor during a starting compensation time of the motor, a change-in-current-value detecting means for detecting an increment of a current value, which is measured by the electric current measuring means, every constant period of time, and a motor control means for supplying a first control signal or a second signal to the motor drive means which continues driving the motor according to the polarity of the detected increment of the current value in response to the first control signal and immediately stops the driving of the motor in response to the second control signal.

In this case, after a predetermined time has elapsed, the motor control means is operative to generate a first control signal, which is used to cause the motor to continue driving the motor, when the polarity of the detected increment of the current value becomes negative, or generate the second control signal, which is used to immediately stop driving the motor, when the detected increment of the current value is positive or zero.

In accordance with this apparatus, during the starting compensation time, the electric current measuring means measures the current value flowing through the motor. The change-in-current-value detecting means detects the increment of the current value, which corresponds to each predetermined constant period of time, on the basis of the measured current value. Further, after the predetermined time has elapsed, when the polarity of the detected increment of the current value becomes negative, the motor control means generates the first control signal to be used to continue driving the motor, and supplies the generated first control signal to the motor driving means. In contrast, if the polarity of the detected increment of the motor is still positive or zero, the motor control means generates the second control signal to be used to immediately stop the driving of the motor and supplies the generated second control signal to the motor driving means.

Meanwhile, in the case where the movable part is normally opened and closed in the starting compensation time of the motor, the polarity of the increment of the current value becomes negative past the middle of the starting compensation time. The motor control means detects the change of the polarity of the increment of the current value to negative. When the change of the polarity of the increment of the current value to negative is detected, the first control signal to be used to continue driving the motor is supplied to the motor drive means. Thus the motor continues rotating or being driven until the stable rotation time, which is subsequent to the starting compensation time, even after it has passed the middle of the starting compensation time. Thereby, the movable part is opened or closed up to a predetermined position.

In contrast, in the case where some object is caught in the movable part in the starting compensation time of the motor, the polarity of the increment of the current value does not become negative but is still positive or zero even past the middle of the starting compensation time. In this case, the motor control means can not detect the negative polarity of the increment of the current value. At that point of time, the second control signal to be used to immediately stop driving the motor is supplied to the motor drive means to thereby immediately stop rotating and driving the motor.

Thus, the apparatus can effectively perform a safety detection even in the case where some object is caught in the movable part in the starting compensation time of the motor. Moreover, the apparatus comes to be able to achieve a safety detection through a period of time, in which the motor rotates, by employing the known safety detection which has been performed in the stable rotation time.

To achieve the second object, in accordance with another aspect of the present invention, there is provided a second vehicle-mounted motor drive apparatus which comprises a motor for moving up and down a movable part according to the direction of rotation thereof, two selector switches respectively designating the directions of rotation of the motor, a pair of switches provided correspondingly to the directions of rotation of the motor, two rotation self-holding circuits, respectively provided correspondingly to the directions of rotation of the motor, for keeping the motor rotated in response to an operation of the switch provided correspondingly to the direction of rotation of the motor, and a latch canceling circuit which is connected to the two rotation self-holding circuits and has a latch canceling switch and a switching device to be driven into an on-state when the motor rotates, and is adapted to turn off the switching device when operating the latch canceling switch, thereby canceling a self-holding state of the rotation self-holding circuit.

Further, to achieve the second and third objects, in accordance with still another aspect of the present invention, there is provided a third vehicle-mounted motor drive apparatus which comprises a motor for moving up and down a movable part according to the direction of rotation thereof, two selector switches respectively designating the directions of rotation of the motor, a pair of switches provided correspondingly to the directions of rotation of the motor, two rotation self-holding circuits, respectively provided correspondingly to the directions of rotation of the motor, for keeping the motor rotated in response to an operation of the switch provided correspondingly to the direction of rotation of the motor, a latch canceling circuit which is connected to the two rotation self-holding circuits and has a latch canceling switch and a first switching device to be driven into an on-state when the motor rotates, and is adapted to cancel a self-holding state of the rotation self-holding circuit when operating the latch canceling switch, a voltage detection circuit for detecting change in terminal voltage of the motor and a second switching device for turning off the first switching device at a high speed in response to a detection output of the voltage detection circuit.

Moreover, in the case of an embodiment (namely, a fourth vehicle-mounted motor drive apparatus) of the second or third vehicle-mounted motor drive apparatuses, each of the two rotation self-holding circuits is provided with a relay which is connected in series with corresponding one of the pair of the switches and has a contact connected between the motor and a power source, and a (third) switching device connected between the relay and the motor. Further, the latch canceling circuit has a charge storage circuit provided within a control circuit for controlling the (first) switching device.

In addition to this, in the case of an embodiment (namely, a fifth vehicle-mounted motor drive apparatus) of the third vehicle-mounted motor drive apparatus, the voltage detecting circuit is operative to detect at least a transient positive (terminal) voltage developing at one of the terminals of the motor and supplies the detected voltage to the second switching device. Further, the second switching device is connected to the charge storage circuit provided in the control circuit for controlling the switching device, which is included in the latch canceling circuit. When turned on, the second switching device causes the charge storage circuit to immediately discharge. Thereby, the switching device is turned off at a high speed.

In the case of the second vehicle-mounted motor drive apparatus, when one of the pair of the switches is operated, the motor is rotated in the direction designated by the operated switch. Further, such a rotating state of the rotation self-holding circuit is maintained by itself. Thus, an automatic operation is started. At that time, if the latch canceling switch provided in the canceling circuit is operated, the switching device provided in the latch canceling circuit is put into an off-state. Thereby, the self-holding state of the rotation self-holding circuit is canceled and the rotation of the motor is stopped. Consequently, the automatic operation is canceled. Thereafter, the motor can be reversed, namely, turned in a direction opposite to the aforementioned direction of the rotation thereof by either operating the other of the pair of the switches or setting the selector switch to another position thereof. Thus, in the case of the second vehicle-mounted motor drive apparatus, all of operations of selecting, changing and canceling the direction of the rotation of the motor are performed by operating the switches. Moreover, a rotation self-holding operation (namely, an operation of maintaining the rotation of the motor) is performed by the rotation self-holding circuit. Furthermore, such a rotation self-holding operation is canceled by the switching device. Thereby, the second vehicle-mounted motor drive apparatus becomes insusceptible to variation in supply power and ambient temperature and to the influence of various kinds of noises. Moreover, a motor drive apparatus, which is small in size and weight and has a small number of components, for a power window can be obtained.

In such a case, if the rotation self-holding circuit is composed of a relay which is connected in series with corresponding one of the pair of the switches (for example, push-button switches) and has a contact connected between the motor and the power source, and a switching device connected between the relay and the motor, similarly as in the case of the fourth vehicle-mounted motor drive apparatus, a motor drive apparatus for a power window, which is smaller in size and weight and has a further smaller number of components, can be obtained.

In the case of the third vehicle-mounted motor drive apparatus, when one of the pair of the switches is operated, the motor is rotated in the direction designated by the operated switch. Moreover, such a rotating state of the rotation self-holding circuit is maintained by itself. Thus, an automatic operation is started. Then, if the selector switch is set to a position corresponding to a direction opposite to the direction designated as above described, change in terminal voltage of the motor, which occurs at this moment, is detected by the voltage detecting circuit. Subsequently, an output of the voltage detecting circuit, which represents a result of the detection, turns on the second switching device. When the second switching device is turned on, the (first) switching device of the latch canceling circuit is immediately put into an off-state. The self-holding state of the rotation self-rotating circuit is canceled, namely, the automatic operation is canceled. Further, when canceling this automatic operation, the motor starts rotating in the direction opposite to the designated direction by setting the selector switch to the position corresponding to the direction opposite to the designated direction. Thus, in the case of the third vehicle-mounted motor drive apparatus, all of operations of selecting, changing and canceling the direction of the rotation of the motor are performed by operating the switches similarly as in the case of the second vehicle-mounted motor drive apparatus. Moreover, the rotation self-holding operation is performed by the rotation self-holding circuit. Furthermore, the rotation self-holding operation is canceled by the switching device. Thereby, the second vehicle-mounted motor drive apparatus becomes insusceptible to variation in supply power and ambient temperature and to the influence of various kinds of noises. Moreover, as described above, when setting the selector switch to a different position thereof, the second switching device turns off the (first) switching device which operates in response to such a setting of the selector switch. Thereby, a motor drive apparatus, which can change the direction of rotation of the motor quickly and securely without operating the latch canceling switch, for a power window can be obtained.

In such a case, if the rotation self-holding circuit is composed of a relay which is connected in series with corresponding one of the pair of the switches (for example, push-button switches) and has a contact connected between the motor and the power source, and a switching device connected between the relay and the motor, similarly as in the case of the fourth vehicle-mounted motor drive apparatus, and the voltage detecting circuit is operative to detect at least a transient positive (terminal) voltage developing at one of the terminals of the motor and supplies the detected voltage to the second switching device, and the second switching device is connected to the charge storage circuit provided in the control circuit for controlling the switching device, which is included in the latch canceling circuit, and when turned on, the second switching device causes the charge storage circuit to immediately discharge to thereby turn off the switching device at a high speed, similarly as in the case of the fifth vehicle-mounted motor drive apparatus, a motor drive apparatus for a power window, which is smaller in size and weight and has a further smaller number of components, can be obtained.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a flowchart for illustrating a process to be performed when a safety detection is carried out in the embodiment of FIG. 1;

FIG. 4 is a characteristic diagram for illustrating an example of change in motor current in each of the case where a movable part is normally opened and closed by means of a motor, and the case where some object is caught in the movable part during the movable part is opened and closed by means of a motor;

DETAILED DESCRIPTION OF THE PREFERRED EMBODIMENTS

Hereinafter, the preferred embodiments of the present invention will be described in detail by referring to the accompanying drawings.

Figure 1:
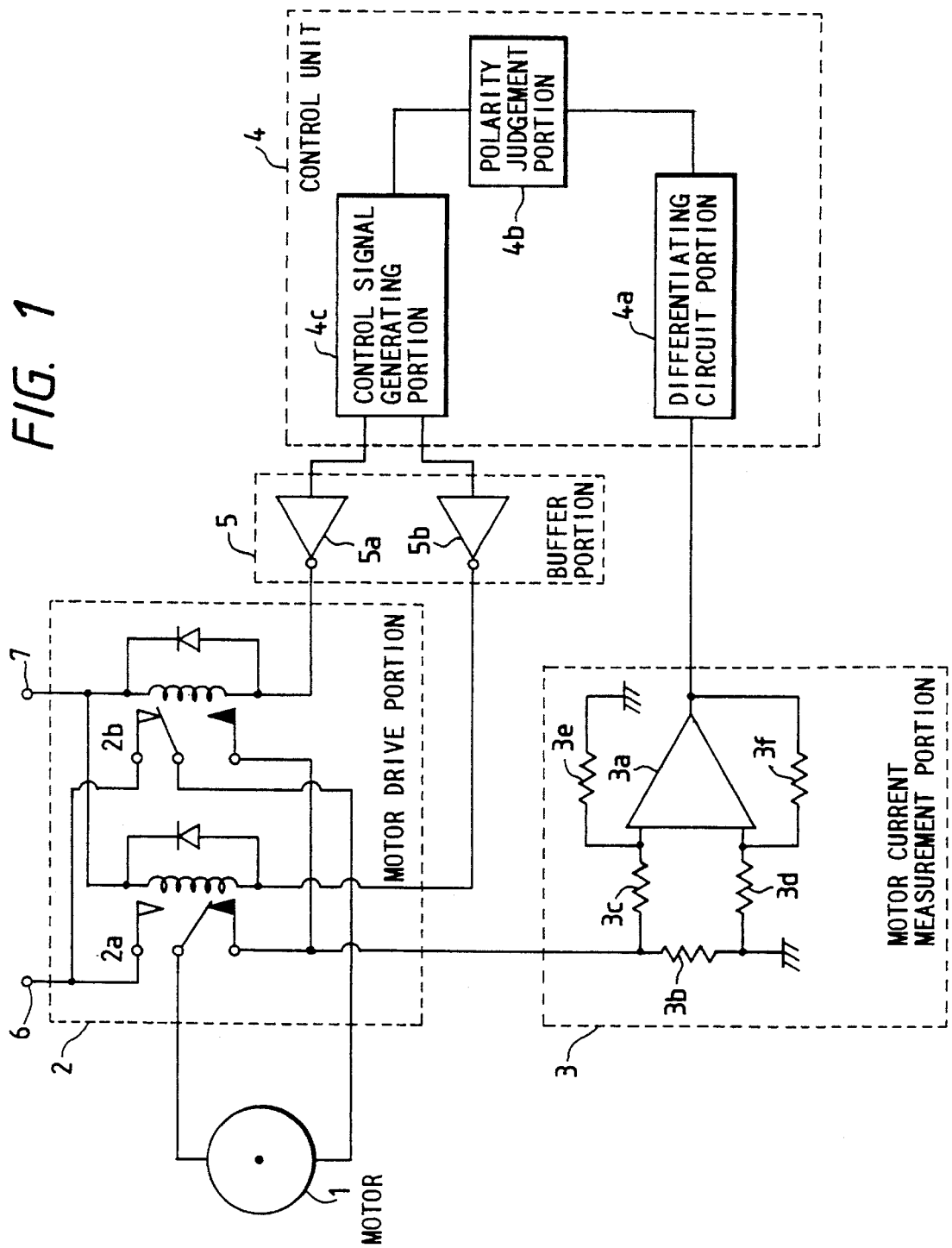
FIG. 1 is a diagram for illustrating the configuration of a safety motor drive apparatus embodying the present invention, namely, an embodiment of the present invention.

FIG. 1 is a diagram for illustrating the configuration of a safety motor drive apparatus embodying the present invention, namely, one of the preferred embodiments of the present invention. Further, movable parts to be opened and closed by means of motors are, for example, a power window and a sun roof of a motor vehicle.

As shown in FIG. 1, a motor 1 is connected to a power window or a sun roof through a connecting mechanism. The power window or the sun roof is opened and closed by rotating the motor 1. A motor drive portion (namely, a motor drive means) is provided with a first relay $2a$ and a second relay $2b$, each of which has two fixed contacts. Further, the movable contact of each of the first and second relays $2a$ and $2b$ is connected to a position between the terminals of the motor 1. Moreover, one of the fixed contacts of each of the relays $2a$ and $2b$ is connected to a common motor drive power source 6. Furthermore, the other of the fixed contacts of each of the relays $2a$ and $2b$ is connected to a common input terminal of a motor current measurement portion 3. Additionally, the driving coil of each of the first and second relays $2a$ and $2b$ has an end connected to a common circuit operating power source 7 and has the other end connected to corresponding one of two output terminals of a buffer portion 5.

The motor current measurement portion (namely, the current measuring means) 3 is provided with an operational amplifier $3a$, a current detecting resistance $3b$, first and second input resistances $3c$ and $3d$, a shunt resistance $3e$ and a feedback resistance $3f$. The operational amplifier $3a$ has an input terminal connected to both of an input terminal of the motor current measurement portion and an end of the current detecting resistance $3b$ through the first input resistance $3c$ and also has the other input terminal connected to the other end of the current detecting resistance $3b$ through the second input resistance $3d$. Further, the shunt resistance $3e$ is connected to a point between the former input terminal of the operational amplifier $3a$ and the ground. An output terminal of the operational amplifier $3a$ is connected to an output terminal of the motor current measurement portion 3 and the latter input terminal thereof through the feedback resistance $3f$. A control unit 4 is provided with a differentiating circuit portion (namely, a change-in-current-value detecting means) $4a$, a polarity judgement portion (namely, a motor control means) $4b$ and a control signal generating portion (namely, a motor control means) 4c. The differentiating circuit portion 4a has an input terminal connected to the output terminal of the motor current measurement portion 3 and has an output terminal connected to an input terminal of the polarity judgement portion 4b. The control signal generating portion 4c has an input terminal connected to an output of the polarity judgment portion 4b and has two output terminals connected to two input terminals of the buffer portion 5, respectively. Further, input terminals of first and second buffer circuits 5a and 5b are connected to the two input terminals of the buffer portion 5, respectively. Moreover, output terminals of the first and second buffer circuits 5a and 5b are connected to two output terminals of the buffer portion 5.

Figure 2A:
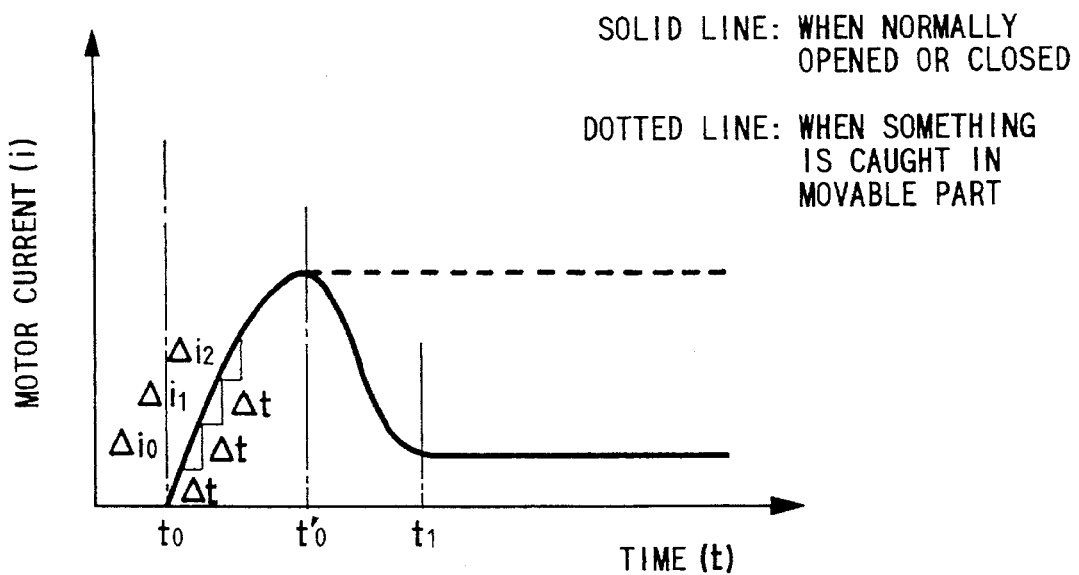
FIG. 2A is a characteristic diagram for illustrating how a motor current value changes during a starting compensation time of a motor of the embodiment of FIG. 1.
Figure 2B:
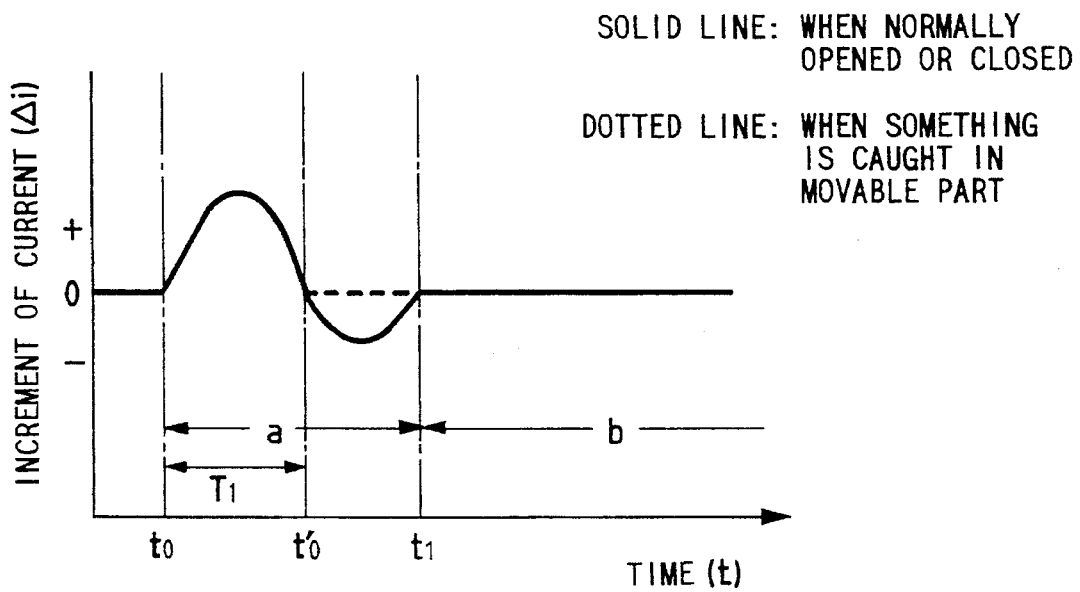
FIG. 2B is a characteristic diagram for illustrating how an increment of a motor current value changes during a starting compensation time of a motor of the embodiment of FIG. 1.

Furthermore, FIG. 2A is a characteristic diagram for illustrating how a motor current value changes during a starting compensation time (namely, a time zone a) of a motor of the embodiment of FIG. 1. Additionally, FIG. 2B is a characteristic diagram for illustrating how an increment of a motor current value changes during the starting compensation time of a motor of the embodiment of FIG. 1. Incidentally, in FIGS. 2A and 2B, solid lines or curves designate the characteristics in the case where the power window or the sun roof is normally opened and closed. Further, dotted lines or curves designates the characteristics in the case where an object is caught in the power window or the sun roof.

Hereinafter, an operation of a safety motor drive apparatus having the aforementioned configuration will be described by referring to FIGS. 1, 2A and 2B.

First, an operation of the apparatus at the time of starting the opening and closing of the power window or the sun roof will be described hereinbelow.

If a passenger operates a switch for opening and closing the power window or the sun roof at the moment $t_0$, initial control signals are sent from the two output terminals of the control signal generating portion 4c, respectively, in response to the operation of the switch. Each of these initial control signals is supplied to the driving coil of each of the first and second relays 2a and 2b of the motor drive portion 2 through corresponding one of the first and second buffer circuits 5a and 5b of the buffer portion 5. In this case, if one of the initial control signals generated from the control signal generating portion 4c has a high signal level and the other has a low signal level, an output of the first buffer circuit 5a comes to have a low signal level. Thereby, the driving coil of the first relay 2a is energized so as to set the movable contact thereof to a different fixed contact thereof. In contrast, the signal level of an output of the second buffer circuit 5b becomes high. Thus the driving coil of the second relay 2b is not energized and the movable contact thereof is not switched. Thereafter, initial electric current flows in the motor 1 in a direction, so that the power window or the sun roof starts opening. In contrast, if one of the initial control signals has a low signal level and the other thereof has a high signal level, an output of the buffer circuit 5a comes to have a high level. Thereby, the driving coil of the second relay 2b is not energized and the movable contact thereof is not switched. However, the signal level of an output of the second buffer circuit 5b becomes low. Thus the driving coil of the second delay 2b is energized and the movable contact thereof is switched. Consequently, initial electric current flows through the motor in the other direction, so that the power window or the sun roof starts closing.

Next, an operation of the apparatus in a period of time between the moments $t_0$ and $t_1$ illustrated in FIG. 2 after the opening or closing of the power window or the sun roof is started, namely, in the starting compensation time (namely, the time zone a) will be described hereunder.

When initial electric current flows through the motor 1 in one of the directions, or in the other direction, this electric current also flows through the current detecting resistance 3b connected in series with the motor 1 by way of each of the contacts of the first and second relays 2a and 2b. Thus a voltage, whose value depends on the current value of the initial current flowing through the motor 1, develops across the terminals of the current detecting resistance 3b. This voltage is supplied to the operational amplifier 3a through the first and second input resistances 3c and 3d and is then amplified by the operational amplifier 3a. Thereafter, the amplified voltage is fed from the output terminal of the operational amplifier 3a to the subsequent differentiating circuit portion 4a provided in the control unit 4. The differentiating circuit portion 4a differentiates the value of the current inputted thereto. As illustrated in FIG. 2A, every lapse of an infinitesimal time $\Delta t$, the differentiating circuit portion 4a generates the differential voltage values representing the increments $\Delta i_0, \Delta i_1, \Delta i_2, \ldots$ of the current value of the electric current flowing through the current detecting resistance 3b in sequence. Then, the increments $\Delta i_0, \Delta i_1, \Delta i_2, \ldots$ of the current value are supplied to the subsequent polarity judgment portion 4b. Further, the polarity judgment portion 4b measures how much time has elapsed since the moment $t_0$ at which the switch for operating the power window or the sun roof is operated. At the moment $t'_0$ when a period of time $T_0$ has elapsed since the moment $t_0$, the polarity judgment portion 4b detects whether the polarities of the inputted increments $\Delta i_0, \Delta i_1, \Delta i_2, \ldots$ of the current value are negative, positive or zero. Further, in the case where a result of this detection reveals that the power window or the sun roof is normally opened or closed and thus the polarities of the inputted increments $\Delta i_0, \Delta i_1, \Delta i_2, \ldots$ of the current value become negative as indicated by the solid curves or lines in FIGS. 2A and 2B, the polarity judgment portion 4b supplies a properness signal to the subsequent control signal generating portion 4c. In contrast, in the case where a result of the detection shows that something is caught in the power window or the sun roof and thus the polarities of the inputted increments $\Delta i_0, \Delta i_1, \Delta i_2, \ldots$ of the current value do not become negative as indicated by the dotted curves or lines in FIGS. 2A and 2B, the polarity judgment portion 4b supplies an improperness signal to the subsequent control signal generating portion 4c. Then, when the properness signal is inputted, the control signal generating portion 4c supplies first control signals, the polarities of which are the same as that of the initial control signal, to the buffer portion (or motor drive circuit) 5 in response to the properness signal. Thereby, the motor drive circuit 5 drives the motor to continuously rotate in the remaining part of the starting compensation time after the moment $t'_0$ and in the stable rotation time after the moment $t_1$. Thus the power window or the sun roof continues opening or closing. In contrast, when the improperness signal is inputted, the control signal generating portion 4c supplies two second control signals, the signal levels of both of which are high or low, to the two input terminals of the motor drive circuit 5, respectively, in response to the improperness signal. Thereby, the motor drive circuit 5 immediately disconnects the motor 1 from the drive power source and stops the rotation of the motor 1.

Thus, in the case of this embodiment, even when some matter is caught in the power window or the sun roof during the starting compensation time (namely, the time zone a) of the motor 1 for opening and closing the power window or the sun roof, it is detected from change in polarity of the increment of the current value of the electric current flowing through the motor 1 about the middle of the starting compensation time that some object is caught in the power window or the sun roof. Then, the operation of driving the motor 1 is immediately stopped. Consequently, the operation of opening or closing the power window or the sun roof is stopped.

In this case, it is preferable to provide a safety detecting means, which operates during the stable rotation time of the motor 1, in this embodiment in addition to another safety detecting means, which operates during the starting compensation time of the motor 1 thereof, similarly as in the case of the known safety motor drive apparatus. As the result of using both of such two safety detecting means, the safety detection can be almost completely performed all through a period of time in which the motor 1 rotates.

Incidentally, in the case of this embodiment, the safety detection is performed on the basis of change in polarity of the increment of the current value of the electric current flowing through the motor 1 at the moment about the middle of the starting compensation time. Further, in the case where an abnormal change in polarity occurs, the driving of the motor 1 is stopped only past the middle of the starting compensation time. The entire starting compensation time is, however, a short time of 100 msec or so. Therefore, even if an object is caught in the movable part past the middle of the starting compensation time, a passenger and a motor or the like can be sufficiently protected by performing the known safety detection to be performed during the stable rotation time of the motor 1.

Referring next to FIG. 3, there is shown a flowchart for illustrating a process of the safety detection to be performed in the embodiment of FIG. 1.

Hereinafter, the process of the safety detection to be performed in this embodiment will be described with reference to this flowchart.

First, when the switch for opening and closing the power window or the sun roof is operated in step S1, the control unit 4 generates an initial control signal so as to let initial electric current flow through the motor 1 in a direction or an opposite direction. Thereby, an operation of driving the motor 1 is commenced. Further, the power window or the sun roof starts opening or closing.

Next, in step S2, the operational amplifier 3a detects an initial current value of electric current flowing through the motor 1 as a value corresponding to a voltage having developed across the terminals of the current detecting resistance 3b.

Subsequently, in step S3, the differentiating circuit portion 4a provided in the control unit 4 judges whether or not the infinitesimal time $\Delta t$ has elapsed, by utilizing a timer or the like. Further, when it is judged that the infinitesimal time $\Delta t$ has elapsed (namely, when exiting to Y-branch), the timer or the like is cleared and the process advances to the next step S4. Conversely, when it is judged that the infinitesimal time $\Delta t$ has not elapsed (namely, when exiting to N-branch), the processing of step S3 is repeatedly performed.

Subsequently, in step S4, the differentiating circuit portion 4a reads the current (or present) value of electric current flowing through the motor 1. calculates the increment $\Delta i_n$ of the current value of the Then, in step S5, the differentiating circuit portion 4a electric current flow in the motor 1, based on the current value read this time and another current value previously read the time $\Delta t$ ago.

Next, in step S6, the polarity judgement portion 4b negative, positive or zero. Further, if the increment $\Delta i_n$ is judges whether the increment $\Delta i_n$ of the current value is judged as negative, the process goes forward to step S12. Moreover, if the increment $\Delta i_n$ is judged as positive, the process returns to step S3 and the processing of steps S3 to S6 will be performed again. Furthermore, if the increment $\Delta i_n$ is judged as zero, the process advances to step S7.

Subsequently, in step S7, the differentiating circuit portion 4a judges whether or not the infinitesimal time $\Delta t$ has elapsed, by utilizing a timer or the like. When it is judged that the infinitesimal time $\Delta t$ has elapsed (namely, when exiting to Y-branch), the timer or the like is cleared and the process advances to the next step S8. In contrast, when it is judged that the infinitesimal time $\Delta t$ has not elapsed (namely, when exiting to N-branch), the processing of step S7 is repeatedly performed.

Subsequently, in step S8, the differentiating circuit portion 4a reads the current (or present) value of electric current flowing through the motor 1.

Then, in step S9, the differentiating circuit portion 4a calculates the increment $\Delta i_{n+1}$ of the value of the electric current flow in the motor 1, based on the current value read this time and another current value previously read the time $\Delta t$ ago.

Next, in step S10, the polarity judgement portion 4b judges whether the increment $\Delta i_{n+1}$ of the current value is negative, positive or zero. Further, if the increment $\Delta i_{n+1}$ is judged as negative, the process goes forward to step S12. Moreover, if the increment $\Delta i_{n+1}$ is judged as positive or zero, the process goes forward to the next step S11.

Then, in step S11, the polarity judgement portion 4b supplies an abnormal signal to the control signal generating portion 4c. Subsequently, the control signal generating portion 4c supplies second control signals to the motor drive circuit 5. When receiving the second control signals, the motor drive circuit 5 immediately stops the operation of driving the motor 1 through the motor drive portion 2. Thus a series of safety detection operations is finished.

Further, in step S12, the polarity judgement portion 4b supplies a normal signal to the control signal generating portion 4c. Subsequently, the control signal generating portion 4c supplies first control signals to the motor drive circuit 5. When receiving the first control signals, the motor drive circuit 5 continuously drives the motor 1 through the motor drive portion 2. Thereafter, similarly, the series of safety detection operations is finished.

Incidentally, in the foregoing description of this embodiment, the case of employing the power window or the sun roof of the motor vehicle as the movable part thereof has been described. The movable part of the present invention is, however, not limited to the power window and the sun roof of the motor vehicle. The present invention can be applied to movable parts similar thereto.

As described above, in the case of this embodiment of the present invention, the current measuring means 3 measures the value of the electric current flowing through the motor 1 during the starting compensation time of the motor. The change-in-current-value detecting means 4a detects the increment of the current value every predetermined period on the basis of the measured current values. In the case where the polarity of the detected increment of the current value becomes negative after a predetermined period of time has elapsed, the motor control means 4b and 4c generate first control signals for continuing the operation of driving the motor 1 and supply the generated first control signals to the motor drive means 2. In contrast, if the polarity of the detected increment of the current value is still positive or zero, the control means 4b and 4c generate the second control signals for immediately stopping the operation of driving the motor 1 and supply the generated second control signals to the motor drive means 2.

Thus, in the case of the apparatus of the present invention, a safety detection can be effectively achieved even in the case where some object is caught in the movable part during the starting compensation time of the motor 1. Further, if such a safety detection is utilized together with the known safety detection to be performed during the stable rotation time, the apparatus of the present invention has an advantage in that the safety detection can be almost completely performed all through the period of time in which the motor 1 rotates.

Hereinafter, the second embodiment of the present invention will be described by referring to the accompanying drawings.

Figure 5:
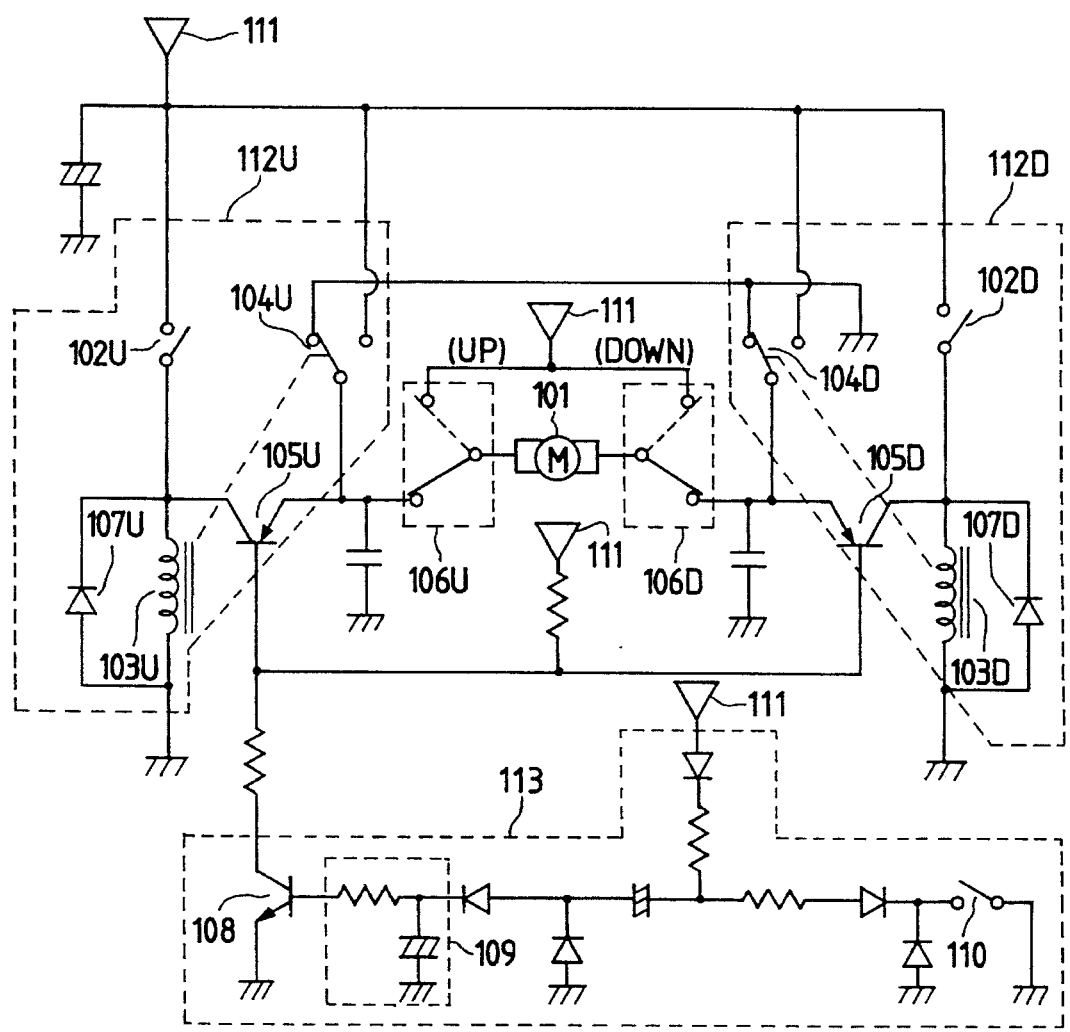
FIG. 5 is a diagram for illustrating the configuration of another motor drive apparatus for a power window, which embodies the present invention, namely, a second embodiment of the present invention.

FIG. 5 is a diagram for illustrating the configuration of another motor drive apparatus for a power window, which embodies the present invention, namely, the second embodiment of the present invention.

In the following description, alphabetical characters "U" and "D" added to reference numerals as suffixes imply that composing elements designated by such reference characters have the functions of moving up and down the window. Further, such characters "U" and "D" correspond to the upward and downward directions, in which, for example, the window is moved, respectively.

As shown in FIG. 5, a lifting rotation self-holding circuit 112U consists of a push-button switch 102U, a relay 103U, in which contacts 104U are provided, a switching transistor 105U for a rotation self-holding, and a spark extinguishing diode 107U, which correspond to the upward movement of the window. The push-button switch 102U and the relay 103U are connected in series to a point between a power supply terminal 111 and the ground. Further, the spark extinguishing diode 107U is connected in parallel with the relay 103U. The movable contact, one of the fixed contacts and the other fixed contact of the contacts 104U are connected to the emitter of the switching transistor 105U, the power supply terminal 111 and the ground, respectively. The collector of the switching transistor 105U is connected to the connection between the push-button switch 102U and the relay 103U. Further, a lowering rotation self-holding circuit 112D consists of a push-button switch 102D, a relay 103D, in which contacts 104D are provided, a switching transistor 105D for a rotation self-holding, and a spark extinguishing diode 107D, which correspond to the downward movement of the window. The push-button switch 102D and the relay 103D are connected in series to a point between the power supply terminal 111 and the ground. Further, the spark extinguishing diode 107D is connected in parallel with the relay 103D. The movable contact, one of the fixed contacts and the other fixed contact of the contact 104D are connected to the emitter of the switching transistor 105D, the power supply terminal 111 and the ground, respectively. The collector of the switching transistor 105D is connected to the connection between the push-button switch 102D and the relay 103D. A d.c. motor 101 has two terminals, one of which is connected to the movable contact of a lifting selector switch 106U, and the other of which is connected to the movable contact of a lowering selector switch 106D. Both of the selector switches 106U and 106D are two-contact selector switches. One of fixed contacts of each of the selector switches 106U and 106D is connected to the power supply terminal 111. Further, the other fixed contact of each of the selector switches 106U and 106D is connected to corresponding one of the switching transistors 105U and 105D, respectively.

Moreover, a latch canceling circuit 113 is composed of a switching transistor 108 for the latch canceling, a charge storage circuit 109 consisting of a series resistance and a shunt capacitor, and a latch canceling switch 110 and so on. The collector of the switching transistor 108 is connected through a resistance to each of the bases of the switching transistors 105U and 105D. Further, the base of the switching transistor 108 is connected to the output terminal of the charge storage circuit 109. Moreover, the emitter of the switching transistor 108 is connected to the ground. The latch canceling switch 110 has two ends, one of which is connected through diodes and resistances to the power supply terminal 111 and is also connected through diodes, a resistance and a capacitor to the input terminal of the charge storage circuit 109, and the other of which is connected to the ground.

Incidentally, the movable contact of each of the selector switches 106U and 106D is usually set in a position indicated by a solid line of FIG. 5. Each of the push-button switches 102U and 102D and the latch canceling switch 110 is normally opened but is closed only when operated. Further, the contacts 104U of the relay 103U and the contacts 104D of the relay 104D are set in the positions illustrated in FIG. 5 when the relays 103U and 103D are not driven (namely, not energized). When the relays 103U and 103D are driven, the contacts 104U of the relay 103U and the contacts 104D of the relay 104D are set in positions opposite to the positions illustrated in FIG. 5. Moreover, the switching transistor 108 is driven into an on-state when the motor 101 rotates, and is put into an off-state when the rotation of the motor 101 is locked.

The motor drive apparatus for the power window, which has the aforementioned configuration, performs the following operation.

First, an operation in the case of moving the window of the motor vehicle by operating the selector switches 106U and 106D will be described hereunder.

In the case where the window now opens but a driver or a passenger wishes to lift and close the window, the lifting selector switch 106U is operated so as to move the movable contact thereof from the position indicated by the solid line to the opposite position indicated by the dotted line. Thereby, an electric current path from the power supply terminal 111 to the ground through the contacts of the lifting selector switch 106U, the d.c. motor 101, the contacts of the lowering selector switch 106D and the contacts 104D of the lowering relay 103D is established. Thus, electric current flows through the motor 101 from the left to the right, as viewed in FIG. 5. Consequently, the motor 101 rotates, so that the window moves upwardly.

In contrast, in the case where the window closes but the driver or the passenger wishes to lower and open this window, the lowering selector switch 106D is operated so as to move the window from the position indicated by the solid line to the position indicated by the dotted line. Thereby, an electric current path from the power supply terminal 111 to the ground through the contacts of the lowering selector switch 106D, the d.c. motor 101, the contacts of the lifting selector switch 106U and the contacts 104U of the lifting relay 103U is established. At that time, electric current flows through the motor 101 from the right to the left, as viewed in FIG. 5. Consequently, the motor 101 is reversed, so that the window moves downwardly.

Next, an operation in the case of automatically moving the window by operating the push-button switches 102U and 102D, namely, an automatic operation will be described hereunder.

In this case, if the window now opens but a driver or a passenger wishes to lift and shut this window, the lifting push-button switch 102U is pushed and the contacts thereof are temporarily closed. Thus, an electric current path from the power supply terminal 111 to the ground through the contacts of the lifting push-button switch 102U and the lifting relay 103U is established. Then, the lifting relay 103U is driven. When driving the relay 103U, the contacts 104U of the lifting relay 103U are set to the position opposite to the position illustrated in FIG. 5. Thereby, a first electric current path from the power supply terminal 111 to the ground through the contacts 104U of the lifting relay 103U, the contacts of the lifting selector switch 106U, the d.c. motor 101, the contacts of the lowering selector switch 106D and the contacts 104D of the lowering relay 103D, as well as a second electric current path from the power supply terminal 111 to the ground through the contacts 104U of the lifting relay 103U, the switching transistor 105U and the lifting relay 103U, is established. As the result of establishing the first electric current path, electric current flows through the motor 101 from the left to the right, as viewed in FIG. 5. Consequently, the motor 101 rotates. Further, when the motor 101 rotates, the switching transistor 108 for a latch canceling is put into an on-state. Thus, the base voltage of the switching transistor 105U lowers, so that the switching transistor 105U is turned on. Consequently, electric current also flows through the second electric current path. Thereby, the lifting relay 103U stops an operation of pushing the push-button switch 102U. Further, even after the contacts of the switch 102U are opened or released from each other, the relay 103U is kept driven. Thus, the lifting rotation self-holding circuit 112U is put into a self-holding state. Thereby, the electric current continues flowing through the motor 101. As a consequence, the window moves up gradually.

Further, in the case where the window closes but the driver or the passenger wishes to lower and open this window, the apparatus performs an operation similar to the aforementioned operation in the case of lifting up the window. First, the lowering push-button switch 102D is pushed and the contacts thereof are temporarily closed. Thus, an electric current path from the power supply terminal 111 to the ground through the contacts of the lowering push-button switch 102D and the lowering relay 103D is established. Then, the lowering relay 103D is driven. When driving the relay 103D, the contacts 104D of the lowering relay 103D are set to the position opposite to the position illustrated in FIG. 5. Thereby, a first electric current path from the power supply terminal 111 to the ground through the contacts 104D of the lowering relay 103D, the contacts of the lowering selector switch 106D, the d.c. motor 101, the contacts of the lifting selector switch 106U and the contacts 104U of the lifting relay 103U, as well as a second electric current path from the power supply terminal 111 to the ground through the contacts 104D of the lowering relay 103D, the switching transistor 105D and the lowering relay 103D, is established. As the result of establishing the first electric current path, electric current flows through the motor 101 from the right to the left, as viewed in FIG. 5. Consequently, the motor 101 rotates. Further, when the motor 101 rotates, the switching transistor 108 for the latch canceling is put into an on-state. Thus, the base voltage of the switching transistor 105D lowers, so that the switching transistor 105D is turned on. Consequently, electric current also flows through the second electric current path. Thereby, the lowering relay 103D stops an operation of pushing the push-button switch 102D. Further, even after the contacts of the switch 102D are opened or released from each other, the relay 103D is kept driven. Thus, the lifting rotation self-holding circuit 112D is put into a self-holding state. Thereby, the electric current continues flowing through the motor 101. As a consequence, the window moves down gradually.

Next, a process in the case of stopping an operation of moving the window during the window continues moving up or down by performing the automatic operation will be described hereinbelow.

In the case where the driver or the passenger wishes to stop the window which is being moved, for example, lifted up, the latch canceling switch 110 provided in the latch canceling circuit 113 is pushed. When the latch canceling switch 110 is pushed, the contacts thereof are closed and thus both ends of the latch canceling switch 110 are connected to the ground. Then, the voltage at the input terminal of the charge storage circuit 109 lowers. Moreover, electric charges stored in the shunt capacitor of the charge storage circuit 109 discharge gradually. Furthermore, the voltage at the output terminal of the charge storage circuit 109 also lowers gradually. Thus, the switching transistor 108 for a latch canceling is turned off. Further, when the switching transistor 108 is turned off, the base voltage of the switching transistor 105U of the lifting rotation self-holding circuit 112U, which is in the self-holding state, is raised and moreover, the switching transistor 105U is turned off. Thus, the self-holding state of the lifting rotation self-holding circuit 112U is canceled. Further, the electrical flow drawn from the power supply terminal 11 to the motor 101 through the contacts 104U of the lifting relay 103U and the lifting selector switch 106U is stopped. Thereby, the motor having been rotated is stopped. Consequently, the operation of lifting up the window is stopped.

Further, in the case of stopping the window which is being lowered, the apparatus performs an process similar to the aforementioned process in the case of stopping the window which is being moved up. First, when the latch canceling switch 110 is pushed, the same operation as in the case of the aforementioned process contacts is performed in the latch canceling circuit 113. Thereby, the switching transistor 105D is turned off. Further, the self-holding state of the lowering rotation self-holding circuit 112D is canceled. Thus, the electrical flow drawn from the power supply terminal 11 to the motor 101 through the contacts 104D of the lowering relay 103D and the lowering selector switch 106D is stopped. Thereby, the motor having been rotated is stopped. Consequently, the operation of lowering the window is stopped.

Incidentally, in the case of moving the window again after the movement of the window has been once stopped, the selector switches 106U and 106D are operated as described above. Alternatively, the push-button switches 102U and 102D may be operated.

Thus, in the case of the second embodiment, all of operations of selecting, changing and canceling the direction of the rotation of the motor are performed by operating the switches, practically, by operating the selector switches 106U and 106D, the push-button switches 102U and 102D and the latch canceling switch 110. Moreover, the rotation self-holding operation is performed by the rotation self-holding circuit 112U and 112D. Furthermore, such a rotation self-holding operation is canceled by the switching devices, practically, by the switching transistors 105U and 105D and the switching transistor 108. Thereby, a d.c. motor drive circuit, which is insusceptible to variation in supply power and ambient temperature and to the influence of various kinds of noises and is small in size and weight and has a small number of components, for a power window can be obtained.

Moreover, in the case of the second embodiment, each of the rotation self-holding circuits 112U and 112D is constituted by corresponding one of the relays 103U and 103D respectively connected in series to the push-button switches 102U and 102D, corresponding one of the sets 104U and 104D of the contacts, which are respectively provided in the relays 103U and 103D, and corresponding one of the switching transistors 105U and 105D which is provided between the motor 101 and corresponding one of the relay 103U and 103D. Thereby, the configuration of the circuit can be extremely simplified. Consequently, a d.c. motor drive apparatus for a power window, which is smaller in size and weight and has a further smaller number of components, can be obtained.

Meanwhile, in the case of the motor drive apparatus for the power window, namely, the second embodiment, there is a fear that the rotation self-holding state of the rotation self-holding circuit 112U or 112D can not be canceled if a passenger or a driver does not continue pushing the latch canceling switch 110 provided in the latch canceling circuit 113 during a predetermined short time in the case where the push-button switch 102U or 102D is pushed and the window starts moving upwardly or downwardly by performing the automatic operation. This is because it is necessary for lowering the output voltage of the charge storage circuit 109 below the cut-off voltage of the switching transistor 108 to continue pushing the latch canceling switch 110 and to discharge more than a predetermined amount of electric charges stored in the shunt capacitor of the charge storage circuit 109. At that time, a time required to continue pushing the latch canceling switch 110 is determined by the circuit constant of the latch canceling circuit 113.

Further, in the case of the motor drive apparatus for the power window, namely, the second embodiment, when the window starts moving in a direction by performing the automatic operation, the window is then moved in the opposite direction in order to prevent a finger or the like of a passenger or a driver from being caught in the power window. Therefore, even if the movable contact of the selector switch 106U or 106D is set to a different position in an instant, the window only stops moving. Further, the rotation self-holding state of the rotation self-holding circuit 112U or 112D can not be canceled. Thus, there is a fear that if the aforementioned operation of pushing the latch canceling switch 110 provided in the latch canceling circuit 113 is not performed, the window can not be thereafter moved in the opposite direction.

Figure 6:
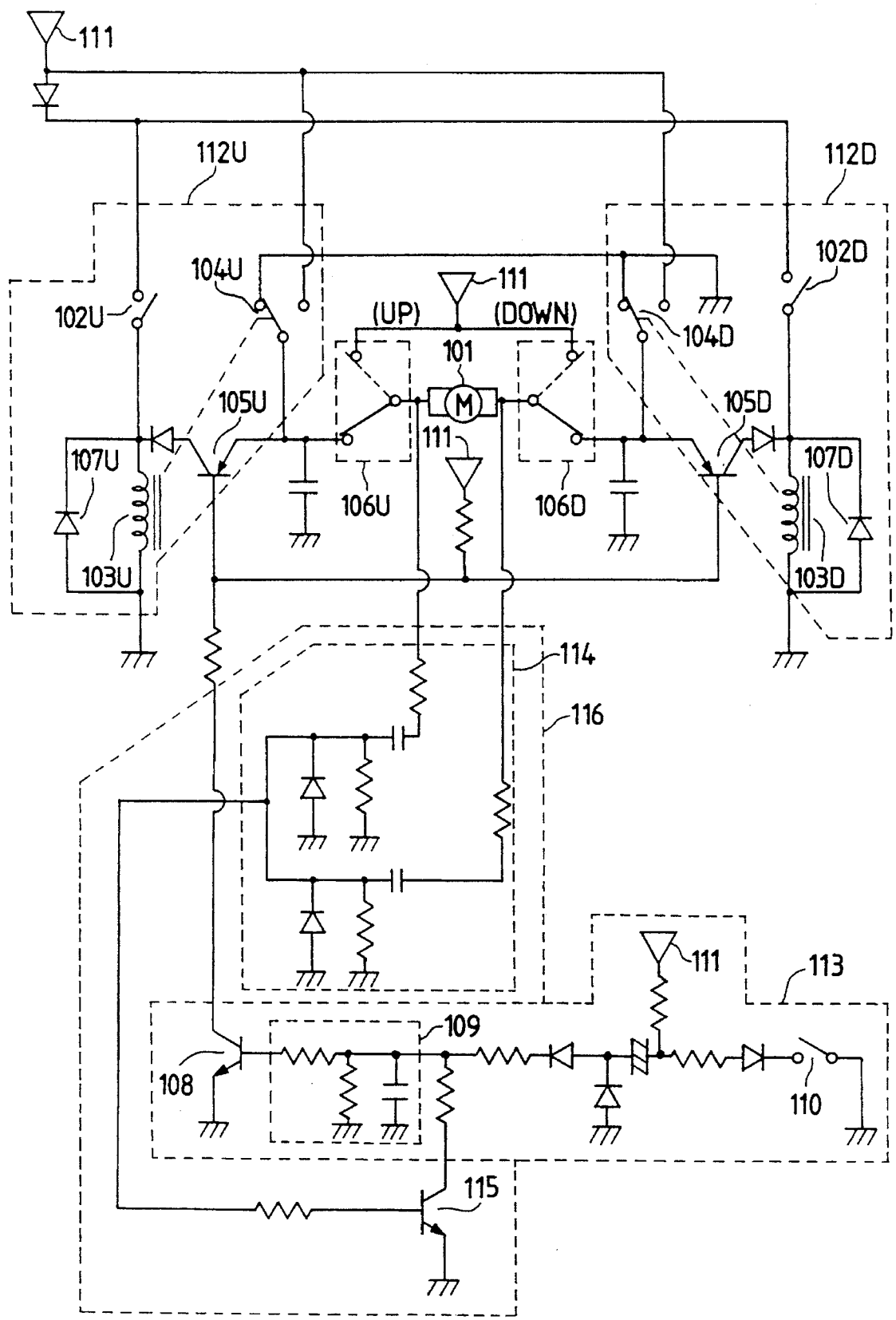
FIG. 6 is a diagram for illustrating the configuration of still another motor drive apparatus for a power window, which embodies the present invention, namely, a third embodiment of the present invention.
Figure 7A:
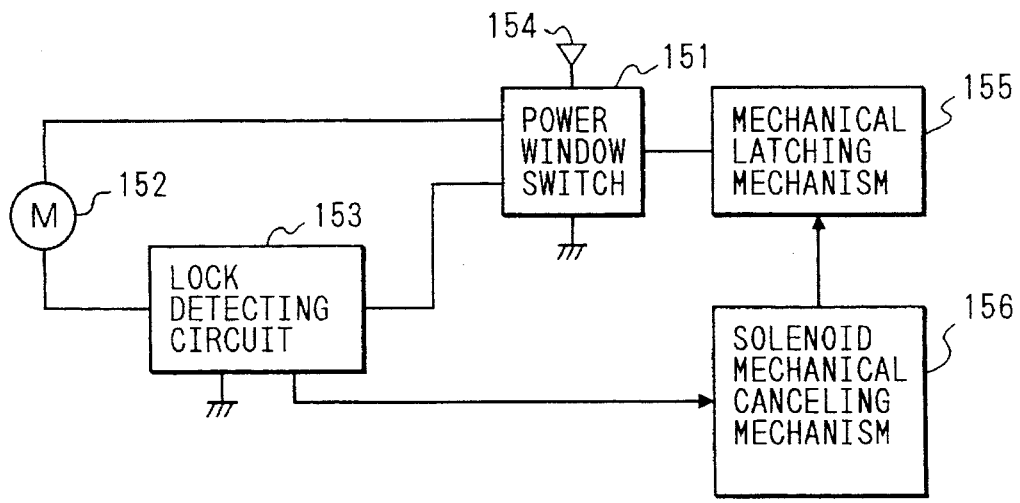
FIGS. 7A and 7B are block diagrams which schematically illustrate the configurations of the two conventional devices of the known types for use in a power window.
Figure 7B:
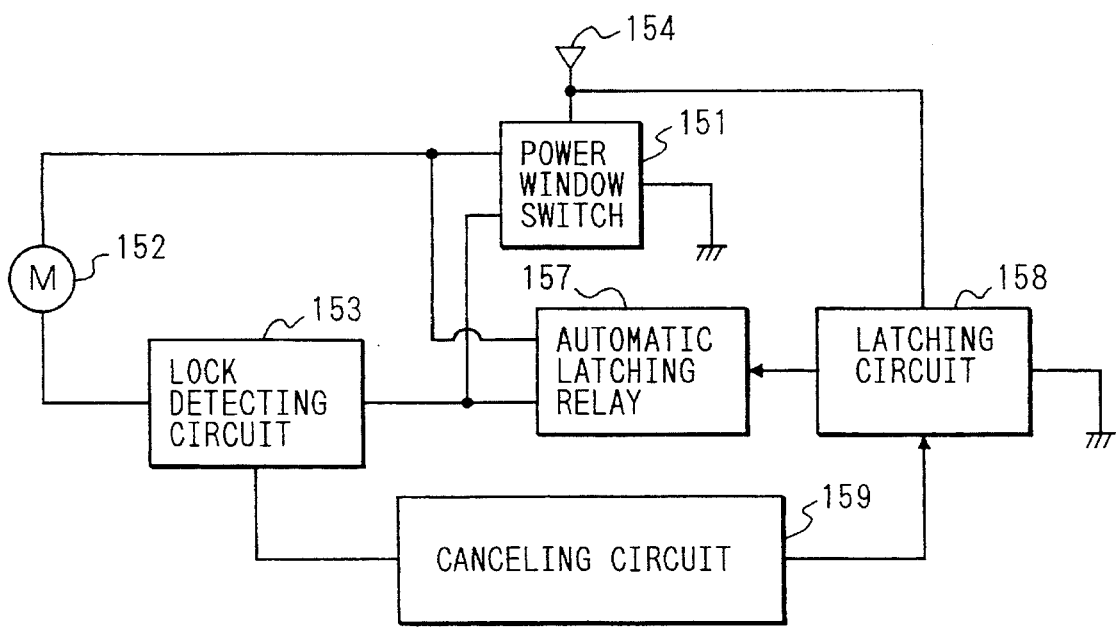

FIG. 6 is a diagram for illustrating the configuration of still another motor drive apparatus for a power window, namely, a third embodiment of the present invention, which can assure safety more securely.

As shown in FIG. 6, an automatic latch canceling circuit 116 is provided with a change-in-terminal-voltage detecting circuit (namely, the voltage detecting circuit) 114 for detecting a terminal voltage of the motor 101 and with a switching transistor (namely, the second switching device) 115 for discharging electric charges. Further, the change-in-terminal-voltage detecting circuit 114 is provided with a differentiating circuit consisting of series resistances, series capacitors and shunt resistances, and with a shunt connection diodes. Moreover, the change-in-terminal-voltage detecting circuit 114 has two input terminals, which are respectively connected to opposite terminals of the motor 101, and an output terminal connected to the base of the switching transistor 115 through a resistance. Moreover, the switching transistor 115 has a collector connected to the input terminal of the charge storage circuit 109 and also has an emitter connected to the ground.

Thus, the third embodiment is characterized in that the automatic latch canceling circuit 116 is added to the composing elements of the aforesaid second embodiment. Incidentally, the detailed descriptions of points of similarity in configuration and operation between the second embodiment and the third embodiment are omitted herein, for the simplicity of description.

Hereinafter, it will be described how the third embodiment operates in the case where when the window is moved in a direction, namely, upwardly or downwardly, the window is moved in the opposite direction by switching the contacts of the selector switch 106U or 106D in an instant.

In the case where a driver or a passenger wishes to change the direction, in which the window is being moved, for example, lifted up by performing the automatic operation, to the downward direction, the movable contact of the lowering selector switch 106D is moved to or set in the opposite position. Namely, this movable contact is moved from the position as indicated by the solid line of FIG. 6 to the position indicated by the dotted line of this figure. When this contact of the selector switch 106D is switched, an electric current flow drawn from the power supply terminal 111 to the ground through the contacts 104U of the relay 103U, the selector switch 106U, the motor 101, the selector switch 106D and the contacts 104D of the relay 103D is interrupted at the selector switch 106D. Thus, the motor 101 having been in a rotating state is stopped. Thereby, the operation of lifting up the window is stopped. Moreover, a transient high voltage develops at a terminal (connected to the selector switch 106U) of the motor 1. This high voltage is supplied to the change-in-terminal-voltage detecting circuit 114. Then, a variation component of this voltage is detected by the differentiating circuit thereof. Thereafter, only a positive component is extracted by the shunt connection diode from the detected variation component. Subsequently, the extracted positive component is supplied to the base of the switching transistor 115. Thereby, the switching transistor 115 is turned on. When this switching transistor 115 is turned on, the shunt capacitor of the charge storage circuit 109 is quickly discharged through the switching transistor 115 which is in an on-state. The voltage at the output terminal of the charge storage circuit 109 drops quickly. Thus, the switching transistor 108 having been in the on-state is immediately turned off. Further, when the switching transistor 108 is turned off, the base voltage of the switching transistor 105U of the rotation self-holding circuit 112U, which is in the self-holding state, is raised. Thus, the switching transistor 105U is turned off and the operation of driving the relay 103U is stopped. Thereby, the self-holding state of the rotation self-holding circuit 112U is canceled. The state of the contacts 104U of the relay 103U is changed into the state thereof illustrated in FIG. 6. Thereby, an electric current path from the power supply terminal 111 to the ground through the selector switch 106D, the state of which has been already changed, the motor 101, the selector switch 106U and the contact 104U of the relay 103U is established. Consequently, the motor 101 is reversed and the window comes to move downwardly.

Further, in the case where the driver or the passenger wishes to change the direction, in which the window is being moved downwardly by performing the automatic operation, to the upward direction, the apparatus performs an process similar to the aforementioned process in the case of changing the direction of the movement of the window to the downward direction. First, the movable contact of the lifting selector switch 106U is moved to or set in the opposite position. Namely, this movable contact is moved from the position as indicated by the solid line of FIG. 6 to the position indicated by the dotted line of this figure. When this contact of the selector switch 106U is switched, an electric current flowing through the motor 101 is interrupted at the selector switch 106U. Thus, the motor 101 having been in a rotating state is stopped. Thereby, the operation of lowering the window is stopped. Moreover, a transient high voltage develops at the other terminal (connected to the selector switch 106D) of the motor 1. Subsequently, a variation component of this voltage is detected by the differentiating circuit of the change-in-terminal-voltage detecting circuit 114. Thereafter, only a positive component is extracted by the shunt connection diode from the detected variation component. Then, owing to the extracted positive component, the switching transistor 115 is turned on. Thereby, the charge storage circuit 109 is quickly discharged. Further, the voltage at the output terminal of the charge storage circuit 109 drops quickly. Thus, the switching transistor 108 having been in the on-state is immediately turned off. Thereby, the switching transistor 105D of the rotation self-holding circuit 112D is turned off and the operation of driving the relay 103D is stopped. Thus, the self-holding state of the rotation self-holding circuit 112D is canceled. The state of the contacts 104D of the relay 103D is changed into the state thereof illustrated in FIG. 6. Thereby, an electric current path from the power supply terminal 111 to the ground through the selector switch 106U, the state of which has been already changed, the motor 101, the selector switch 106U and the contact 104D of the relay 103D is established. Consequently, the motor 101 is reversed and the window comes to move upwardly.

Thus, in addition to the advantages of the second embodiment, the third embodiment further has an advantage in that the direction of the rotation of the motor 101, namely, the direction of the movement of the window can be immediately changed, without pushing the latch canceling switch 110, only by switching the contact of the selector switch 106U or 106D during the window starts moving up or down by performing the automatic operation. Further, in the case of the third embodiment, the direction of the movement of the window (namely, the direction of the rotation of the motor 101) is changed by turning off the switching transistor 108 for the latch canceling through the switching transistor 115 for discharging electric charges, which is turned on when switching the contact of the selector switch 106D or 106U. Thereby, the third embodiment has the advantage in that the direction of the movement of the window (namely, the direction of the rotation of the motor 101) can be immediately changed.

Incidentally, in the case of each of the aforementioned embodiments, PNP junction type transistors are used as the switching transistors 105U and 105D. Further, NPN junction type transistors are used as the switching transistors 108 and 115. Each of the transistors 105U, 105D, 108 and 115 of the present invention is not limited to such a kind of a transistor. Other kinds of transistors may be used as the transistors 105U, 105D, 108 and 115. For example, if the polarity of the power supply voltage is changed, NPN junction type transistors may be used as the switching transistors 105U and 105D and moreover, PNP junction type transistors may be used as the switching transistors 108 and 115. Alternatively, instead of using such junction type transistors, junction type or insulated type field effect transistors (FETs) may be used.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A vehicle-mounted motor drive apparatus comprising:
   a motor for opening and closing a movable part which is openable and closable;
   a motor drive means for selectively driving and stopping the motor;
   an electric current measuring means for measuring a current value representing an electric current flowing through the motor;
   a change-in-current-value detecting means for generating a plurality of successive incremental current values, which are determined from the current value measured by the electric current measuring means, every constant period of time; and
   a motor control means for supplying one of a first control signal and a second control signal to the motor drive means, the first control signal being generated when a polarity of detected incremental current value changes from positive to negative during a starting compensation time, and the second control signal being generated when the polarity of detected incremental current value either remains positive or changes from positive to zero during the starting compensation time;
   wherein the motor drive means continues driving the motor in response to the first control signal and immediately stops the driving of the motor in response to the second control signal.

2. The vehicle-mounted motor drive apparatus according to claim 1, wherein the change-in-current-value detecting means includes a differentiating circuit portion for generating the incremental current values by differentiating the current value of electric current flowing through the motor.

3. A vehicle-mounted motor drive apparatus comprising:
   a motor for moving a movable part in first and second opposite directions according to a direction of rotation thereof;
   first and second switches for applying a drive potential across the motor such that the motor is driven in a first rotating direction during actuation of the first switch, and in a second rotating direction upon actuation of the second switch;
   third and fourth switches;
   first and second rotation self-holding circuits, the first rotation self-holding circuit including a first relay switch for connecting the drive potential across the motor through the first switch in response to actuation of the third switch, the second rotation self-holding circuit including a second relay switch for connecting the drive potential across the motor through the second switch in response to actuation of the fourth switch; and
   a latch canceling circuit which is connected to the first and second rotation self-holding circuits and has a latch canceling switch and a switching device which is driven into an on-state when the motor rotates, and is adapted to turn off the switching device when the latch canceling switch is actuated, thereby canceling a self-holding state of the first and second rotation self-holding circuits.

4. A vehicle-mounted motor drive apparatus comprising:

a motor for moving a movable part in first and second opposite directions according to a direction of rotation thereof;

first and second switches for applying a drive potential across the motor such that the motor is driven in a first rotating direction during actuation of the first switch, and in a second rotating direction upon actuation of the second switch;

third and fourth switches;

first and second rotation self-holding circuits, the first rotation self-holding circuit including a first relay switch for connecting the drive potential across the motor through the first switch in response to actuation of the third switch, the second rotation self-holding circuit including a second relay switch for connecting the drive potential across the motor through the second switch in response to actuation of the fourth switch; and a latch canceling circuit which is connected to the first and second rotation self-holding circuits and has a first switching device which is driven into an on-state when the motor rotates, wherein the latch canceling circuit is adapted to cancel the self-holding state of the rotation self-holding circuit when the first switching device is turned off;

a voltage detection circuit for detecting a change in a terminal voltage of the motor and for generating a detection output signal; and a second switching device for turning off the first switching device at a high speed in response to the detection output signal generated by the voltage detection circuit.

5. The vehicle-mounted motor drive apparatus according to claim 3, wherein each of the first and second rotation self-holding circuits comprises:

a relay coil which is connected in series with a corresponding one of the third and fourth switches and has a contact connected between the motor and the drive potential; and a second switching device connected between the relay coil and the motor, the second switching device having a control terminal connected to the switching device of the latch canceling circuit.

6. The vehicle-mounted motor drive apparatus according to claim 3, wherein the latch canceling circuit has a charge storage circuit provided within a control circuit for controlling the switching device.

7. The vehicle-mounted motor drive apparatus according to claim 4, wherein the voltage detecting circuit is adapted to detect at least a transient positive terminal voltage developing at one of the terminals of the motor and supplies the detected voltage to the second switching device.

8. The vehicle-mounted motor drive apparatus according to claim 4, wherein the second switching device is connected to a charge storage circuit provided in a control circuit for controlling the first switching device, the first switching device being included in the latch canceling circuit, wherein when turned on, the second switching device causes the charge storage circuit to immediately discharge, thereby turning off the first switching device at a high speed.

9. The vehicle-mounted motor drive apparatus according to claim 4, wherein the latch canceling circuit has a charge storage circuit provided within a control circuit for controlling the first switching device.

10. The vehicle-mounted motor drive apparatus according to claim 4, wherein each of the first and second rotation self-holding circuits comprises:

a relay coil which is connected in series with a corresponding one of the third and fourth switches and has a contact connected between the motor and the drive potential; and a third switching device connected between the relay coil and the motor, the third switching device having a control terminal connected to the first switching device of the latch canceling circuit.

* * * * *